United States Patent [19]

Sasahara

[11] 4,141,226
[45] Feb. 27, 1979

[54] OPERATING MECHANISMS OF ELECTRIC DEVICES

[75] Inventor: Yasumasa Sasahara, Hamamatsu, Japan

[73] Assignee: Nippon Gakki Seizo Kabushiki Kaisha, Japan

[21] Appl. No.: 762,941

[22] Filed: Jan. 26, 1977

[30] Foreign Application Priority Data

Jan. 29, 1976 [JP] Japan .................. 51-8197[U]

[51] Int. Cl.² ........................................ F16D 3/26
[52] U.S. Cl. .............................. 64/17 R; 74/10 R; 325/312
[58] Field of Search ............. 64/17 R, 17 SP, 10 R, 64/8; 46/221, 26, 29; 325/312

[56] References Cited

U.S. PATENT DOCUMENTS

| 1,478,324 | 12/1923 | Dina | 64/17 R |
| 1,918,160 | 7/1933 | White | 334/84 |
| 1,993,357 | 3/1935 | Braun | 64/17 A |
| 4,011,513 | 3/1977 | Kawachi | 74/10 R |

FOREIGN PATENT DOCUMENTS 2106699  10/1971  Fed. Rep. of Germany .......... 64/17 R

*Primary Examiner*—Samuel Scott
*Assistant Examiner*—Gerald A. Anderson
*Attorney, Agent, or Firm*—Charles W. Helzer

[57] ABSTRACT

In an electric device wherein the shaft of a rotary component part of the electric device is operated by an operating member located eccentrically with respect to the axis of the shaft, a universal coupling is provided between the operating member and the shaft.

10 Claims, 9 Drawing Figures

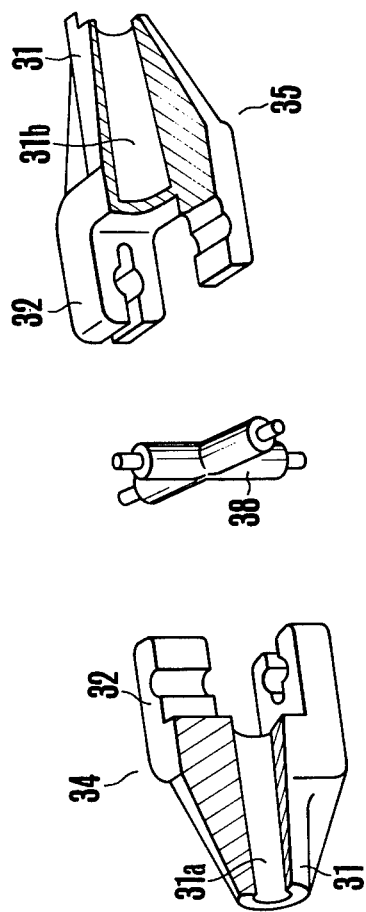

OPERATING MECHANISMS OF ELECTRIC DEVICES

BACKGROUND OF THE INVENTION

This invention relates to an operating mechanism of an electric machine, apparatus, device or component part thereof, hereinafter merely called an electric device for brevity.

A rotary electric device, for example a variable resistor and a rotary switch, utilized in a stereo-amplifier and in many other apparatus has been mounted directly on a front panel of a casing or on a chassis disposed near the front panel, and operated by a handle or knob on the front side of the panel. In most cases such rotary electric device is disposed to ensure electrical connection between other electric component parts mounted on a printed circuit board or between such other component parts and pin jacks terminals, etc. which are mounted on a rear panel. In such a case, as the distance between the rotary electric device and the other component parts is large, relatively long wiring conductors must be used. Such long wiring is not efficient and requires a large amount of material thus increasing the cost of manufacturing. In an electric device processing a very small signal, a long wiring conductor also causes noise by electromagnetic induction and increases stray capacitance thereby degrading the signal to noise ratio and frequency characteristic. Moreover long wiring conductors render it difficult to neatly arrange the component parts of the device.

To solve this problem I previously invented an operating mechanism of an electric device wherein component parts such as a rotary rheostat and a rotary switch are disposed in the rear portion inside of the electric device and these component parts are operated by relatively long shafts connected therewith through disengageable and foldable couplings and provided with knobs on the front side of the panel so as to make as short as possible the wiring conductors and making easy removal and mounting of the component parts. (Japanese utility model application No. 89929 of 1975)

With this construction, however, it is necessary to arrange the knobs and the associated component parts on respective straight lines. Because, if the knob is mounted on an axis eccentric with respect to the axis of the operating shaft a stress corresponding to the eccentricity would be applied to the component part thus decreasing the accuracy and life thereof as well as the operation feeling.

Such straight arrangement decreases the versatility in the layout of the component parts in the electric device. Moreover, the positions of the knobs are limited by the positions of such rotary component parts as variable resistors and switches. This decreases the freedom of the ornamental design of the front panel.

SUMMARY OF THE INVENTION

Accordingly, it is an object of this invention to provide an improved operating mechanism of an electric device capable of decreasing the length of the wiring conductors between rotary component parts and the other component parts installed in the electric device.

Another object of this invention is to provide an improved operating mechanism of an electric device capable of improving the degree of freedom of the layout of the component parts in the device.

Still another object of this invention is to provide an improved operating mechanism of an electric device capable of mounting the component parts at desired positions.

A further object of this invention is to provide a novel operating mechanism of an electric device capable of increasing the degree of freedom of selecting an ornamental design of the device, especially the front panel thereof.

A further object of this invention is to provide an improved operating mechanism of an electric device wherein even when the knob is mounted eccentrically with respect to the operating shaft of a component part there is neither torque variation nor undue stress applied on the component part thus increasing its operating life and the accuracy of the operation thereof.

These and further objects can be accomplished by providing an electric device including a rotary component part rotated by a shaft and an operating member for rotating the shaft, characterized by a universal coupling interposed between the operating member and the shaft.

BRIEF DESCRIPTION OF THE DRAWINGS

In the accompanying drawings:

FIG. 6 is an exploded and partially fragmentary view showing a modified universal coupling.

DESCRIPTION OF THE PREFERRED EMBODIMENTS

Figure 1:
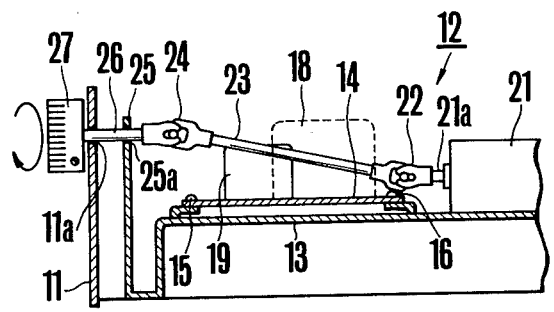
FIG. 1 is a side view showing one embodiment of the operating mechanism of this invention.

A preferred embodiment of this invention shown in FIG. 1 is applied to an amplifier 12 mounted on a chassis 13 and provided with a front panel 11. A printed circuit board 14 is secured to the front portion of the upper side of the chassis 13 by means of screws 15 and 16 and such electric component parts as a transformer 18 and a power integrated circuit 19 are mounted on the printed circuit board 14. Further, resistors and condensers, not shown, are also mounted on the printed circuit board 14 and connected to the transformer 18 and the power integrated circuit 19 via wiring conductors, not shown. To the rear portion of the chassis 13 is secured a rotary variable resistor or rheostat 21 having an operating shaft 21a projecting toward the front side of the panel 11. The operating shaft 21a is coupled to a connecting rod 23 through a universal coupling 22 made of a plastic, for example, and provided according to this invention. The connecting rod 23 extends through the space between the transformer 18 and the power integrated circuit 19 without contacting them and toward the front panel 11. The front end of the connecting rod 23 is connected to one end of a second universal coupling 24 having similar construction to the first mentioned universal coupling 22. The other end of the universal coupling 24 is connected to the shaft 26 of an operating knob 27 which extends through an opening 11a of the front panel 11 and the opening 25a of a subchassis 25 arranged on the rear side of the front panel 11 to extend in parallel therewith. The knob 27 is mounted at a slightly higher level than the variable resistor 21 so that the connecting rod 23 is inclined as shown in FIG. 1.

Figure 2:
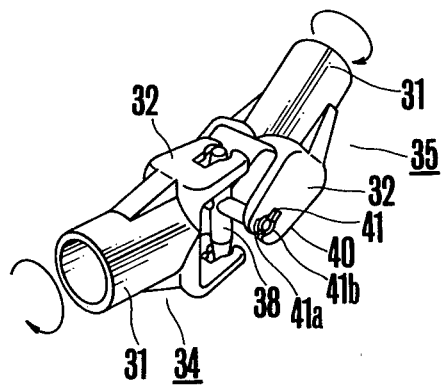
FIG. 2 is a perspective view of one example of a universal coupling utilized in the operating mechanism of this invention.

As shown in FIG. 2, each of the universal couplings 22 and 24 comprises a driving member 34 and a driven member 35, each including a hub 31, and a U shaped member 32 associatedly formed at one end of the hub 31. The opposing U shaped members are coupled together by a criss-cross shaped coupling pin 38. These component parts are moulded from a plastic material.

Describing in more detail the connection between the driving and driven member 34 and 35 and the coupling pin 38, each leg of the U shaped members 32 is formed with a slot 41 having a width slightly smaller than the diameter of the ends of the coupling pin 38 and provided with opposed recesses 41a and 41b on both sides of the slot for rotatably accommodating the end of the pin 38.

With the construction described above it is possible to position the variable resistor at such position that can decrease the length of the wiring conductors between the resistor and the other component parts instead of at a position close to or directly mounted on the rear side of the front panel as in the well known construction. As a consequence, it is possible to mount the variable resistor at any suitable position on the chassis without regarding the ornamental design of the front panel. This construction also permits free layout of the other component parts of the amplifier without regarding the position of the variable resistor.

As is well known, a universal coupling can transmit the torque of the driving member to the driven member angularly displaced with respect to the driving member. Accordingly, it is possible to transmit the rotation of the knob to the variable resistor through the inclined connecting rod 23.

In the prior art operating mechanism disclosed in Japanese Utility Model Application No. 89929 of 1975, for example, it has been necessary to align the axis of the knob and the axis of a rotary electric component part in a straight line. However, according to the present invention even when the operating knob is off-line with respect to the axis of the rotary electric component it is possible to satisfactorily operate it. Further, the rotation of the connecting rod does not cause any variation in the torque for rotating the variable resistor, thus preventing decrease in the life thereof caused by the torque variation. Further, it is possible to operate the rotary variable resistor with the same touch feeling as if it were mounted on the front panel, regardless the fact that the knob is off-line with respect to the axis of the operating shaft of the variable resistor. Where the distance between the knob and the variable resistor is varied it is only necessary to use a connecting rod 23 having different length. Thus, it is possible to position the variable resistor closer to the rear panel or the printed circuit board supporting various component parts.

Figure 3:
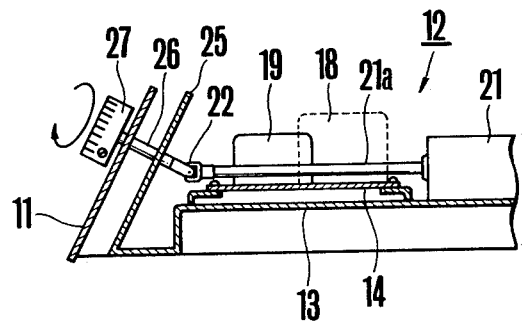
FIG. 3 is a side view showing an another embodiment of this invention.

FIG. 3 shows a modified embodiment of the operating mechanism of this invention, in which elements corresponding to those shown in FIG. 1 are designated by the same reference numerals. In this case the front panel 11 is inclined to the vertical and the knob 27 mounted thereon is connected to the operating shaft 21a of the variable resistor 21 through a universal coupling 22. Different from the embodiment shown in FIG. 1, in this modification, only one universal coupling is sufficient. By using the shaft 21a having different length, the variable resistor 21 can be located at any distance from the front panel 11 or the printed circuit board.

Figure 4:
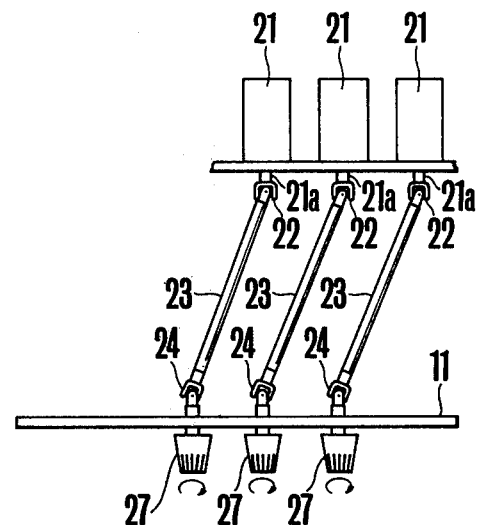
FIG. 4 is a plan view of a still another embodiment of this invention.
Figure 5:
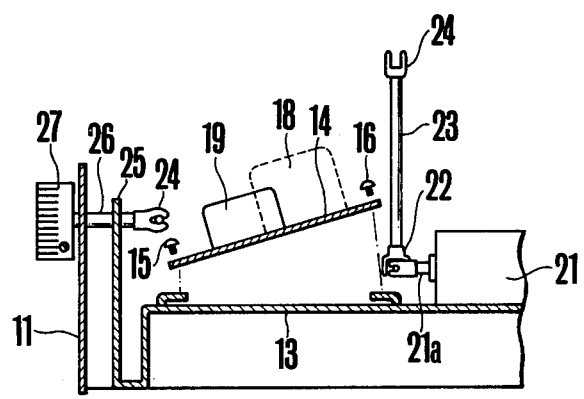
FIG. 5 is an exploded view of the mechanism of this invention.

In each of the foregoing embodiments, the universal coupling is bent in a vertical plane, but as shown in the plan view shown in FIG. 4, it may be bent in the horizontal plane. It should also be noted that the universal coupling may be bent both in vertical and horizontal planes simultaneously. Where two or more universal couplings are used for one rotary component element, it is possible to transmit the motion in any direction. In this manner, according to this invention, the degree of freedom in the layout of the component elements and the ornamental design of the front panel can be improved.

Although the construction of the universal coupling is not limited to that shown in FIG. 2, such construction permits easy assembly and removal of the printed circuit board beneath the connecting rod 23. Thus, where the amplifier becomes faulty due to a fault of the printed circuit board 14 or such component parts as the transformer 18 or a power integrated circuit 19 mounted thereon, it is possible to dismount the printed circuit board 14 from the chassis 13 for repair by holding with one hand the driving member 34 on the side of the knob and pulling the driven member 35 by the other hand toward the variable resistor, rotating the connecting rod 23 about the other universal coupling 22 and then removing screws 15 and 16.

FIG. 6 shows a modified universal coupling which is different from that shown in FIG. 2 in that a through opening 31a is formed in the axial direction through the hub 31 of the driving member 34 whereas the opening 31b in the hub of the driven member 35 is blind.

Figure 7A:
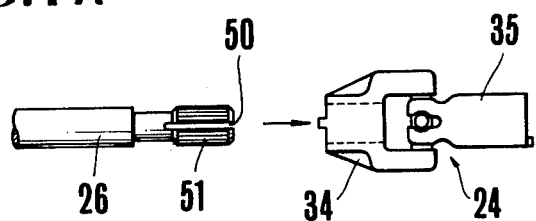
FIGS. 7A, 7B and 7C show the steps of assembling the coupling shown in FIG. 6.
Figure 7B:
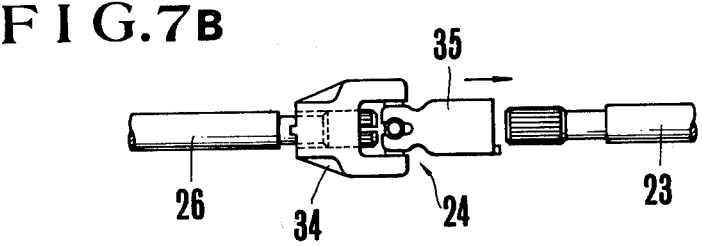
Figure 7C:
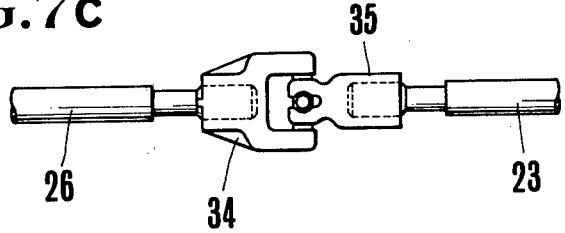

With this construction it is possible to couple the connecting rod 23 with the shaft 26 by the steps as shown in FIGS. 7A, 7B and 7C.

More particularly, as shown in FIG. 7A, at first, the end of the shaft 26 is pushed into the opening 31a of the driving member 34 as shown by an arrow. This end of the shaft 26 is provided with serrations 51 and diametric slit 50 for rendering easy insertion, and for increasing the friction against relative rotation of the shaft and the driving member. As shown in FIG. 7B the shaft 26 is inserted into the driving member 34 until the end of shaft 26 abuts the end of the driven member 35 when fully inserted. Thereafter, the assembly is moved toward the connecting rod 23 to receive it as shown in FIG. 7C. Similar serration and slit are provided for the end of the connecting rod 23, as shown. With this modified coupling it is possible to decrease the distance between the shaft 26 and the connecting rod 23. Accordingly, it is possible to increase the length of the hubs of the universal coupling and the length of the portions of the shaft 26 and of the connecting rod 23 received in the hubs than in the case shown in FIG. 2, thus increasing the friction against relative rotation and ensuring positive torque transmission.

Either one of the axial openings may be blind or both of these openings may be through openings.

The invention is also applicable to the drive of a variable capacitor and a rotary switch instead of a variable resistor.

Further, the driving mechanism is also applicable to any electric devices as a television or radio receiver.

As above described, according to this invention, it is possible to make short as far as possible the length of the wiring conductors to reduce the torque variation, and to increase the degree of freedom of the layout of the component parts and the ornamental design of the front panel of the electric device.

What is claimed is:

1. In an electric device including a rotary component element rotated by a shaft coupled thereto, and a manually controlled operating member for rotating said shaft, the improvement comprising rotational coupling means including at least one universal coupling for connecting said operating member to said component element, said universal coupling including first and second members each having a hub portion and a U-shaped portion connected to one end of said hub portion, and a crisscross coupling member for coupling together said first and second members at their U-shaped portions, the hub portion of at least one of said first and second members having a through opening formed in the axial direction thereof for receiving one end of either said operating member or said shaft and dimensioned to make frictional contact with the received end whereby the received end is allowed to move axially, penetrate through and be drawn back into said through opening along the axis thereof but is gripped firmly in the rotational direction.

2. The improvement according to claim 1 wherein said operating member is located eccentrically with respect to the axis of said shaft and said operating member and said rotary shaft are coupled together by means of the rotational coupling means.

3. The improvement according to claim 1 wherein said manually controlled operating member is mounted on a front panel and said rotary component part is mounted on a chassis behind said front panel.

4. The improvement according to claim 1 wherein said U shaped portions of first and second members are located orthogonally with respect to each other.

5. The improvement according to claim 4 wherein the received end of the operating member or shaft is provided with axially extending serrations whereby the received end is allowed to move axially, penetrate through and be withdrawn into the through opening of the hub portion but is gripped firmly in the rotational direction.

6. The improvement according to claim 4 wherein a blind opening is formed in the axial direction through the hub of the other member.

7. The improvement according to claim 2, wherein said operating member and said shaft are coupled together through rotational coupling means comprising an intermediate rod mounting a universal coupling on each end, one of said universal couplings receiving said operating member and the other receiving said shaft.

8. The improvement according to claim 3, wherein said operating member is located on said front panel and said rotary component part is mounted on said chassis at a remote rear location in said electric device.

9. The improvement according to claim 4, wherein each leg of said U shaped portion has a slot of width slightly smaller than the diameter of the ends of said coupling pin and has opposed recesses on both sides of said slot to rotatably receive an end of said coupling pin.

10. The improvement according to claim 4, wherein each of said first and second members is moulded from plastics.

* * * * *